US006886091B1

(12) United States Patent
Vissers et al.

(10) Patent No.: US 6,886,091 B1
(45) Date of Patent: Apr. 26, 2005

(54) REPLACING VLIW OPERATION WITH EQUIVALENT OPERATION REQUIRING FEWER ISSUE SLOTS

(75) Inventors: Kornelis A. Vissers, Sunnyvale, CA (US); Marcel J. A. Tromp, San Jose, CA (US); Jos van Eijndhoven, Waalre (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 466 days.

(21) Appl. No.: 09/895,473

(22) Filed: Jun. 29, 2001

(51) Int. Cl.[7] ............................................... G06F 7/38
(52) U.S. Cl. .................... 712/24; 712/215; 712/226; 717/140
(58) Field of Search .................... 712/24, 215, 226, 712/23; 717/140

(56) References Cited

U.S. PATENT DOCUMENTS

| 5,689,674 A | * | 11/1997 | Griffith et al. ............... 712/217 |
| 5,862,399 A | * | 1/1999 | Slavenburg et al. .......... 712/24 |
| 5,974,537 A | * | 10/1999 | Mehra .......................... 712/215 |
| 6,076,154 A | | 6/2000 | Van Eijndhoven et al. ... 712/24 |
| 6,134,633 A | | 10/2000 | Jacobs .......................... 711/137 |
| 6,226,715 B1 | | 5/2001 | Van Der Wolf et al. ..... 711/133 |
| 6,336,182 B1 | * | 1/2002 | Derrick et al. ............... 712/204 |
| 2002/0019927 A1 | * | 2/2002 | Hondou ....................... 712/214 |
| 2003/0067473 A1 | * | 4/2003 | Taylor et al. ................ 345/561 |

* cited by examiner

Primary Examiner—Kenneth S. Kim (57) ABSTRACT

Super functional units are used to execute not only single super-instructions that take more than one issue slot, but also a number of equivalent regular VLIW instructions. Accordingly, the same hardware can thus be used to execute either a superoperation or a combination of regular operations, potentially combined with other smaller super-operations. Using super functional units in this way promotes efficient use of computing resources by making computing resources that might otherwise be used unnecessarily by superoperations available for use by single-slot instructions or by smaller superoperations. In some embodiments, a compiler analyzes program and other data to identify superoperations that can be reduced to equivalent single-slot instructions. The compiler maps these operations to a single slot of a super functional unit, reducing the computing resources occupied by the operation.

34 Claims, 5 Drawing Sheets

REPLACING VLIW OPERATION WITH EQUIVALENT OPERATION REQUIRING FEWER ISSUE SLOTS

TECHNICAL FIELD

The invention relates to programmable processors and, more particularly, execution of instructions in such processors.

BACKGROUND

A multi-slot processor uses multiple independent functional units to process operations in parallel. One common example of a multi-slot processor is a very long instruction word (VLIW) processor. A VLIW instruction packages multiple basic commands or operations into a single instruction. Typically, each such basic command represents a RISC operation and includes an opcode, two source operand definitions, and a result operand definition. The source operand definitions and the result operand definition refer to registers in the register file. During execution of the command, the source operands are read from the particular issue slot by supplying fetch signals to the read ports associated with the issue slot in order to fetch the operands. The functional unit typically receives the operands from these read ports, executes the command according to the opcode, and writes back a result into the register file via the write port associated with the particular issue slot. Alternatively, commands may use fewer than two operands and/or produce no result for the register file.

VLIW processors may include a plurality of instruction slots, also known as issue slots, and each slot may execute one operation of the VLIW instruction. Each slot may have an associated set of functional units, but generally, only one functional unit in a given slot may be used at any given time. Each issue slot is also associated with two read ports and one write port to a register file. The functional units may be pipelined to increase processing speed.

U.S. Pat. No. 6,076,154, issued to Van Eijndhoven et al. on Jun. 13, 2000 and assigned to U.S. Philips Corporation, the disclosure of which is incorporated herein in its entirety, describes a VLIW processor having functional units that are conceptually more than one issue slot wide. These functional units are known as superoperational functional units or, equivalently, super functional units. Super functional units can execute instructions, known as superop instructions or superoperations, that have an opcode and several registers as operands. For example, a transpose instruction uses four input registers and two output registers. Superoperations can be considered to take the computing resources of more than one regular VLIW instruction.

SUMMARY

In general, the invention is directed to techniques for using super functional units to execute not only single super-instructions that take more than one issue slot, but also a number of regular VLIW instructions. In other words, the same hardware can thus be used to execute either a superoperation or a combination of regular operations, potentially combined with other smaller superoperations. In this way, the techniques promote efficient use of computing resources by taking advantage of computing resources that might otherwise be wasted by superoperations, and making the computing resources available for use by single-slot instructions or by smaller superoperations.

In some embodiments, the invention may involve analyzing program and other data to identify superoperations that can be reduced to, i.e., replaced by, equivalent single-slot instructions. Such operations may be mapped to a single slot of a super functional unit or to other conventional single issue functional units, thereby reducing the computing resources occupied by the operation.

One embodiment is directed to a method of compiling a software program for a programmable processor having a super functional unit associated with at least two issue slots. A compiler receives a set of processor-executable operations that includes a superoperation typically associated with at least two issue slots. The compiler analyzes parameters for the operation, for example, and determines whether the superoperation can be replaced by a processor-executable operation associated with fewer than all of the issue slots associated with the functional unit.

In another embodiment, a compiler receives a processor-executable superoperation and determines a number of input registers and a number of output registers that are used by the superoperation. When the superoperation uses at most two input registers and one output register, the compiler replaces the superoperation with an equivalent single-slot operation.

Still another embodiment is directed to a method of executing an instruction by a processor having a super functional unit. The processor determines whether the instruction can be executed using fewer than all of the issue slots associated with the super functional unit. When the instruction can be executed using fewer than all of the issue slots, the processor maps the instruction to fewer than all of the issue slots.

Other embodiments of the invention include methods for compiling programs for performing these methods, as well as computer-readable media and apparatuses for performing these methods. The above summary of the invention is not intended to describe every embodiment of the invention. The details of one or more embodiments of the invention are set forth in the accompanying drawings and the description below. Other features, objects, and advantages of the invention will be apparent from the description and drawings, and from the claims.

DETAILED DESCRIPTION

In general, the invention facilitates the use of super functional units to execute combinations of regular VLIW instructions, smaller superoperations, or both, in addition to executing superoperations. Further, a single super functional unit can be used to execute multiple single slot VLIW instructions, potentially combined with other smaller superoperations. This mode of operation prevents the scheduling of regular operations from unnecessarily blocking issue slots that could otherwise be used to execute other instructions. Efficient use of computing resources is thus promoted.

In some embodiments, a compiler analyzes program and other data to identify superoperations that can be reduced to, i.e., replaced by, equivalent single-slot instructions. The compiler maps such operations to a single slot of a super functional unit, thereby reducing the computing resources occupied by the operation.

In this detailed description, reference is made to the accompanying drawings that form a part hereof, and in which are shown by way of illustration specific embodiments in which the invention may be practiced. It is understood that other embodiments can be utilized and structural changes can be made without departing from the scope of the invention.

Figure 1:
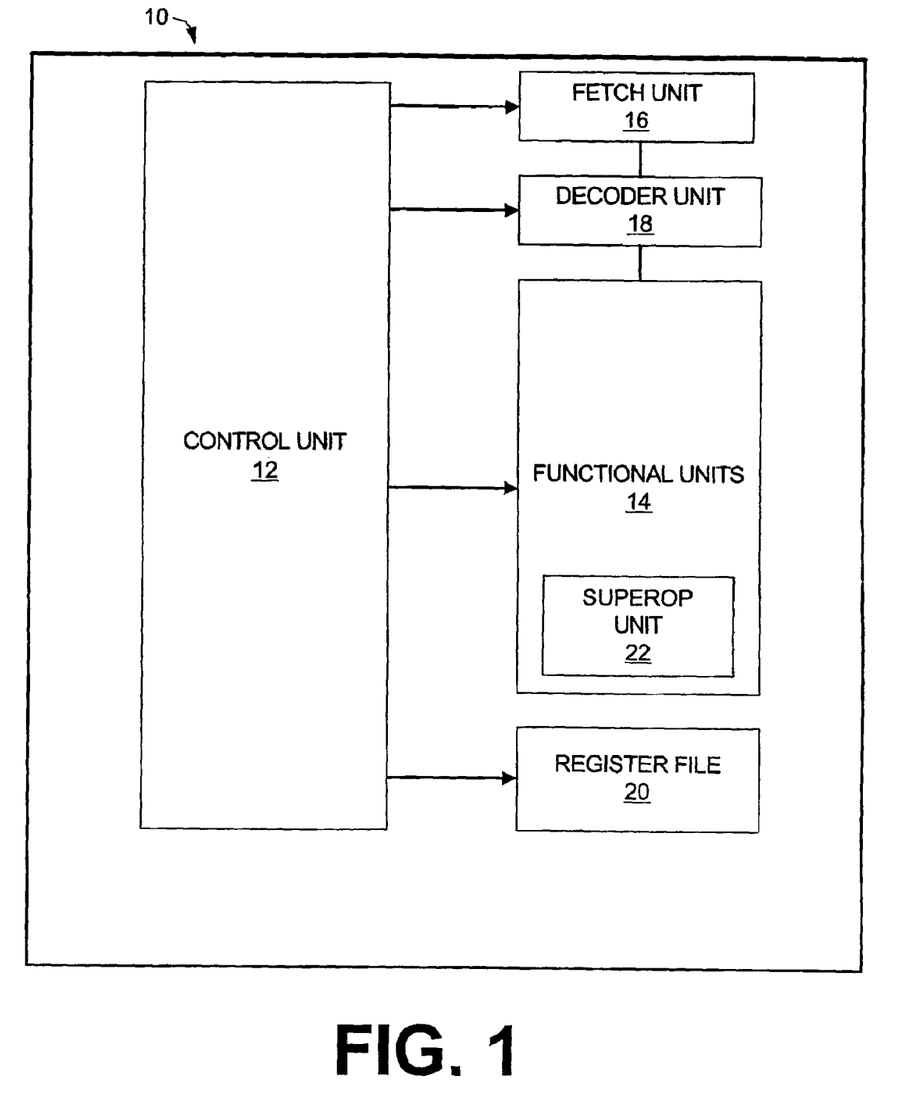
FIG. 1 is a block diagram illustrating an example programmable processor arranged to use super functional units, according to one embodiment of the invention.

FIG. 1 is a block diagram illustrating a programmable processor 10 arranged to use super functional units in a manner consistent with the principles of the invention. The description of FIG. 1 is intended to provide a brief, general description of suitable processor hardware and a suitable processing environment with which the invention may be implemented. Although not required, the invention is described in the general context of instructions being compiled or executed by processor 10.

As shown in FIG. 1, processor 10 includes control unit 12 coupled to one or more functional units 14. Control unit 12 controls the flow of instructions and/or data through functional units 14. For example, during the processing of an instruction, control unit 12 directs the various components of processor 10 to fetch and decode the instructions, and to correctly perform the corresponding operations using, for example, functional units 14. Additional units such as fetch unit 16, decode unit 18, or a decompression unit may be coupled to functional units 14 and controlled by control unit 12. In addition, functional units 14 are also coupled to a register file 20, which stores both the operands and the results of operations.

Under the direction of control unit 12, decode unit 18 pre-processes the instructions to ready them for execution by functional units 14. For example, decode unit 18 may decompress and decrypt complex instructions into an executable form, referred to as executable instructions, and parse the executable instructions to identify one or more specified operations and corresponding operands. A compiler may compress and/or encrypt the complex instructions using various techniques, which can significantly reduce the amount of memory needed to store the instructions, particularly when instructions support multiple operations, as is the case with the instructions supported by most Very Long Instruction Word (VLIW) architectures. Information for decompressing or decrypting an instruction, such as a digital key, may be fixed in hardware, stored in static memory, or stored in the preceding instruction within the instruction stream.

Functional units 14 receive the instructions in executable form from decode unit 18 and carry out the operations specified by the instructions. Functional units 14 may contain specialized hardware for performing the various operations including, for example, one or more arithmetic logic units (ALUs), floating-point units (FPUs), barrel shifters, and load/store units. As described above, register file 20 stores results or other data during the processing of instructions.

In some implementations, functional units 14 are pipelined such that operations can be loaded into a first stage of a pipelined functional unit and processed through subsequent stages. A stage processes concurrently with the other stages. Data passes between the stages in the pipelined functional units during a cycle of the system. The results of the operations emerge at the end of the pipelined functional units in rapid succession. In other implementations, functional units 14 are not pipelined.

Though not required, in one mode of operation, fetch unit 16 receives an instruction from an instruction stream. This instruction is then decoded by decode unit 18, and delegated to the appropriate functional unit 14 by control unit 12. Functional unit 14 retrieves the operand or operands from register file 20, executes the instruction, and writes the result of the operation into register file 20.

The methods and techniques described herein can be implemented in connection with a variety of different processors. For example, processor 10 can be any of a variety of processor types, such as a reduced instruction set computing (RISC) processor, a complex instruction set computing (CISC) processor, variations of conventional RISC processors or CISC processors, or a very long instruction word (VLIW) processor. By way of example, some details of the invention will be described in the context of a VLIW processor. It should be noted, however, that the invention is not limited in implementation to any particular type of processor, and any description of a particular processor type should not be construed to limit the scope of the invention.

The VLIW architecture may include a plurality of instruction slots each having an associated set of functional units 14, and each slot may be adapted to execute one operation of a VLIW instruction. In some implementations, the VLIW processor allows issue of five operations in each clock cycle according to a set of specific issue rules. The issue rules impose issue time constraints and result writeback constraints. Issue time constraints result because each operation implies a need for a particular type of functional unit. Accordingly, each operation requires an issue slot that has an instance of the appropriate functional unit type attached. These functional units require time to recover after performing an operation, and during this recovery time, other operations that require a functional unit that is being recovered cannot be performed. Writeback constraints result because no more than five results should be simultaneously written to register file 20. Any set of operations that meets the issue time and result writeback constraints constitutes a legal instruction.

In one embodiment of the invention, processor 10 includes at least one superop unit 22 coupled to control unit 12. Superop unit 22 is associated with more than two read ports and/or more than one write port to a register file 20. For example, a superop unit 22 for executing a transpose instruction uses four input registers and two output registers in the register file 20. Because superop unit 22 uses more registers than a regular functional unit, which uses two input registers and one output register, superop unit 22 is associated with more than one issue slot and can implement instructions that take more than one issue slot. While a significant portion of this description relates most particularly to super functional units having two issue slots, it is noted that superop unit 22 may have three or more issue slots.

According to an embodiment of the invention, processor 10 can use superop unit 22 to execute either a superoperation or a combination of regular operations, possibly combined with other smaller superoperations. For example, a superop unit 22 that takes two issue slots can be used to execute a superoperation that also takes two issue slots or, alternatively, two regular operations that each take one issue slot.

Processor 10 typically includes or is used in conjunction with some form of processor readable media. By way of example, and not limitation, processor readable media may comprise computer storage media and/or communication media. Computer storage media includes volatile and nonvolatile, removable and nonremovable media implemented in any method or technology for storage of information such as processor-readable instructions, data structures, program modules, or other data. Computer storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by processor 10. Communication media typically embodies processor readable instructions, data structures, program modules, or other data in a modulated data signal, such as a carrier wave or other transport medium and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Computer readable media may also include combinations of any of the media described above.

Figure 2:
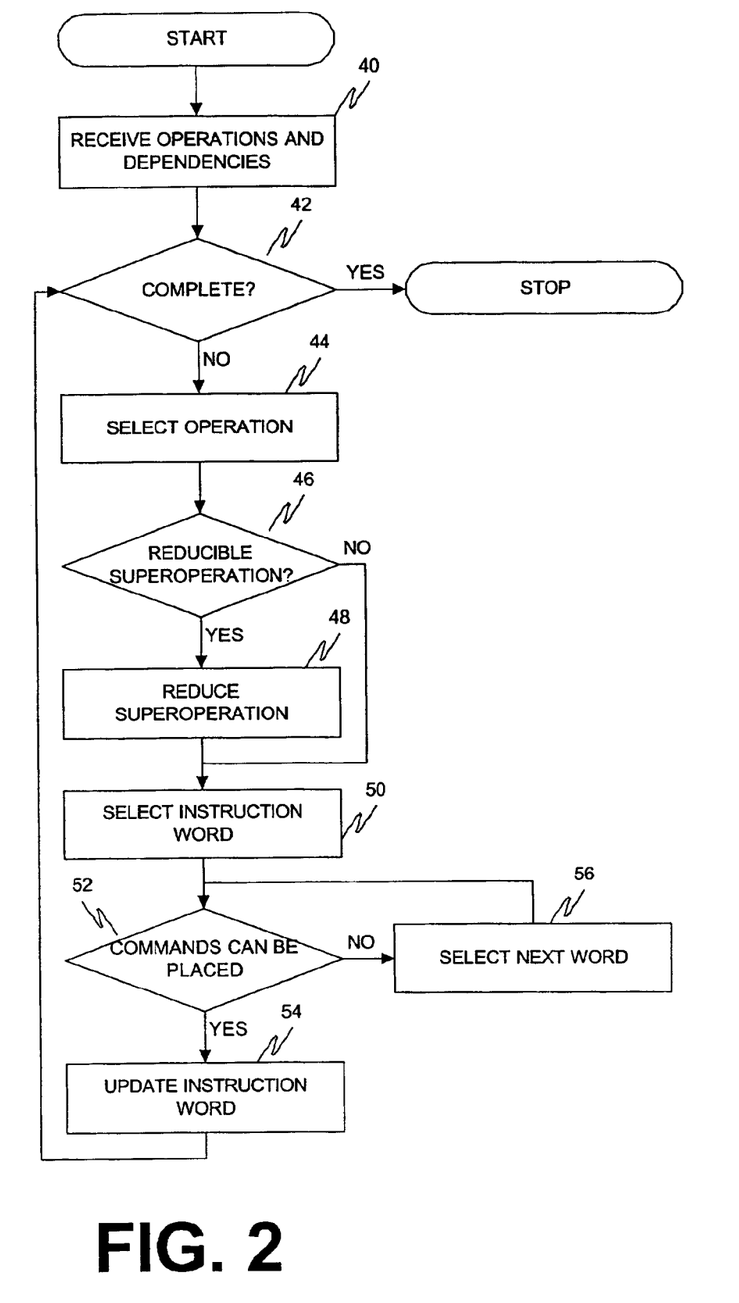
FIG. 2 is a flow chart illustrating a mode of operation for compiling a program.

FIG. 2 is a flow chart illustrating a mode of operation for compiling a program in order to generate the instruction for execution by processor 10. In compiling a program, the compiler may describe a program in terms of a number of commands with data dependencies between the commands, and searches for a way of placing all commands in a set of instruction words. During this process, the compiler use the techniques described herein to reduce the number of instruction words that need to be executed sequentially during execution of the program.

To compile a program, the compiler first receives a set of operations together with a specification of data dependencies between operations (40). Some of the operations thus received may be superoperations that consume more than one issue slot. Next, the compiler analyzes the data dependencies and searches for a way to place commands for the operations in a set of instruction words (42). Once all of the commands have been incorporated into a set of instruction words, the compiler terminates the compilation process. If not, the compiler selects an operation for which no command has yet been placed and for which preceding source operations that produce its operands have already been placed (44).

If the selected operation is a superoperation, the compiler analyzes it and associated data and determines whether the superoperation can be reduced to a regular operation (46). In connection with this analysis, the compiler identifies which input and/or output registers are used by the superoperation. If the compiler determines, for example, that a particular superoperation would not use more than two input registers, it reduces the superoperation to a regular operation (48), as the additional input registers used by the superoperation are not necessary. As another example, the compiler may determine that a superoperation typically requiring five issue slots may only need four or fewer slots due the actually data being processed, and therefore can be reduced. On the other hand, if the selected operation is a regular operation or an irreducible superoperation, the compiler does not reduce the selected operation.

In either case, the compiler then selects an instruction word from the set of eligible instruction words (50). In particular, an instruction word is eligible for placing a command for the selected operation if it occurs after the instruction words in which commands for the selected operation's source operations, which produce the operands of the selected operation, have been placed. Next, the compiler determines whether it can construct an instruction word that contains the commands already included in that earliest instruction word plus a command for the selected operation (52). If the operation is a reducible superoperation, the compiler substitutes an equivalent regular operation or smaller superoperation when placing the operation into an instruction word. In this manner, the compiler avoids unnecessary use of issue slots that are not needed by the operation. Such issue slots, which would otherwise be unavailable for use by other operations, are thereby made available to be used by other operations.

The compiler may consider the nature of the commands and the grouping of the functional units into issue slots when determining whether to place the commands in different groups of functional units, and thereby reserve the issue slots of the super functional units for the superoperation.

If the compiler can construct an instruction word that contains the commands already included in the selected instruction word and also a command for the selected operation, the compiler updates the selected instruction word to incorporate the command (54) and the process repeats (42). If the compiler cannot construct such an instruction word, however, the compiler instead selects an instruction word subsequent to the selected instruction word (56) and attempts to construct an instruction word with the newly selected instruction word (52). This process repeats until either the compiler identifies a suitable command for incorporation within the selected instruction or exhausts the set of operations.

In general, minimization is performed under constraints of data dependencies between commands. For example, if a first command uses as input a result from a second command, these commands should be placed in different instruction words, and the instruction word that contains the first command should follow the instruction word that contains the second command. Moreover, the minimization is performed under the constraint that the functional units are capable of starting execution of all commands in parallel for each instruction word.

Figure 3:
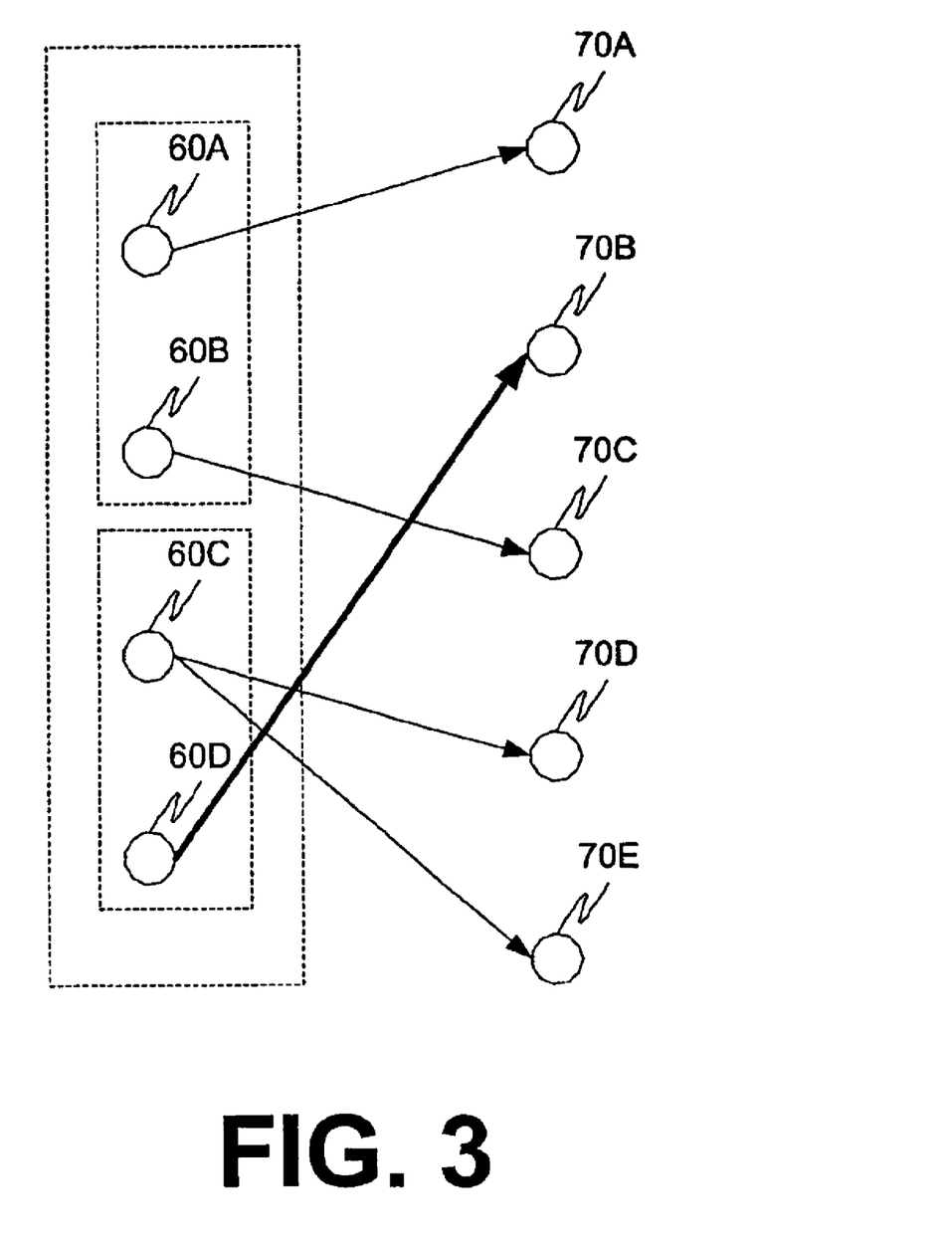
FIG. 3 is a diagram illustrating placement of operations into instruction words according to one operational example of the invention.

FIG. 3 is a diagram illustrating an example placement of a set of operations into one or more instruction words. In FIG. 3, one set of nodes conceptually represents operations 60A, 60B, 60C, and 60D, collectively referred to as operations 60. Another set of nodes conceptually represents issue slots 70A, 70B, 70C, 70D, and 70E, collectively referred to as issue slots 70. These issue slots are each associated with a group that contains a functional unit capable of performing the relevant operation. Superoperations 60C and 60D normally map to two or more issue slots. Regular operations 60A and 60B, on the other hand, map to single issue slots.

If neither superoperation is reduced to a regular operation that maps to only one issue slot, it may be observed that there are insufficient issue slots to map all of the operations. In this example, however, if the compiler determines that one of the superoperations, e.g., superoperation 60D, can be reduced to a regular operation, the compiler maps the superoperation to a single issue slot. As depicted by the heavy line in FIG. 3, the compiler maps superoperation 60D to issue slot 70B. With this superoperation thus reduced to a regular operation, the compiler is able to map all of the operations into instruction words.

Figure 4:
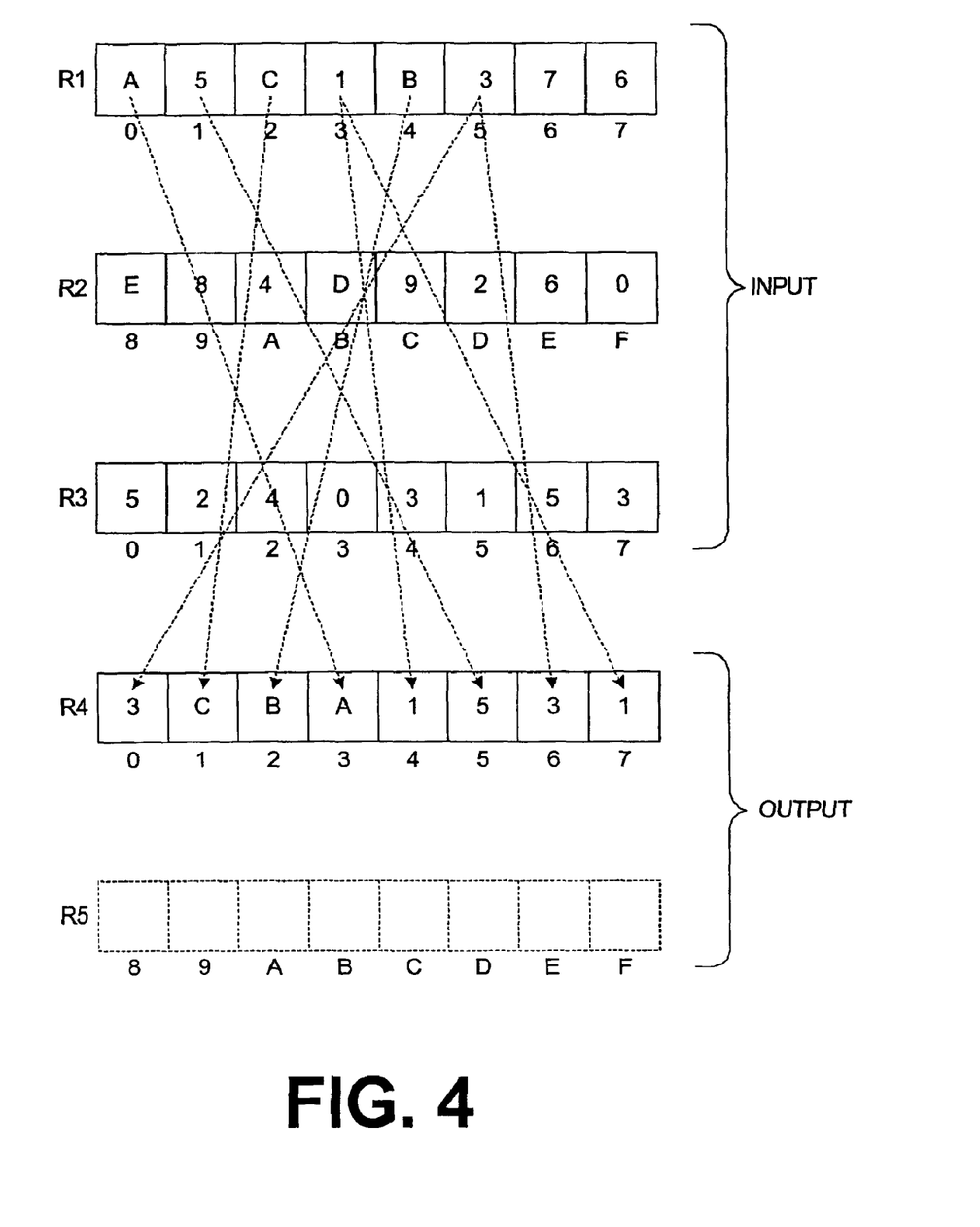
FIG. 4 is a diagram illustrating an operational example of the invention.

An appreciation of the operation of the invention can be gained by consideration of an operational example. In this example, a shuffle operation is considered:

SH R1, R2, R3→R4 (, R5)

This operation permutes and/or selects numbers stored in registers R1 and R2 according to a permutation specified in shuffle register R3. The numbers are stored in permuted order in register R4 and, optionally, register R5. FIG. 4 conceptually illustrates the shuffle operation of this operational example. The shuffle operation normally uses three input registers—two operand registers and one shuffle register—and one or two output registers, depending on whether optional output register R5 is used. Accordingly, because regular operations can only use two input registers and one output registers, the shuffle operation would normally be a superoperation that would require two or more issue slots.

In this example, however, the compiler can analyze the data and make two determinations. First, because shuffle register R3 is only eight bytes wide, the output of the shuffle operation will also be eight bytes wide. As a result, register R5 is not used in this case. It is noted that if shuffle register R3 were greater than eight bytes wide, the output of the shuffle operation would also be greater than eight bytes wide, and register R5 would be used. If register R5 were used, the compiler would not be able to map the shuffle operation to one issue slot, as the operation would use more than one output register. The second determination is that no byte in shuffle register R3 has a value greater than 7 and, as a result, the second operand register R2 is also not used. That is, none of the bits in the second operand register R2 affect the output of the shuffle operation.

Accordingly, the shuffle operation in this case only requires two input registers, namely, operand register R1 and shuffle register R3, and one output register. The compiler therefore reduces the shuffle operation from a superoperation to a regular operation by replacing the superoperation with an equivalent regular operation that only uses one issue slot. Any other issue slots that would otherwise have been occupied by the superoperation are thus freed for use by other single slot instructions or by superoperations of lesser width.

The invention is not limited to use with super functional units that have two issue slots. The principles of the invention are equally applicable to super functional units that have three or more issue slots. For example, a super functional unit that has four issue slots can function as two super functional units that each have two issue slots, or as a super functional unit that has three issue slots and a regular functional unit that has one issue slot.

Figure 5:
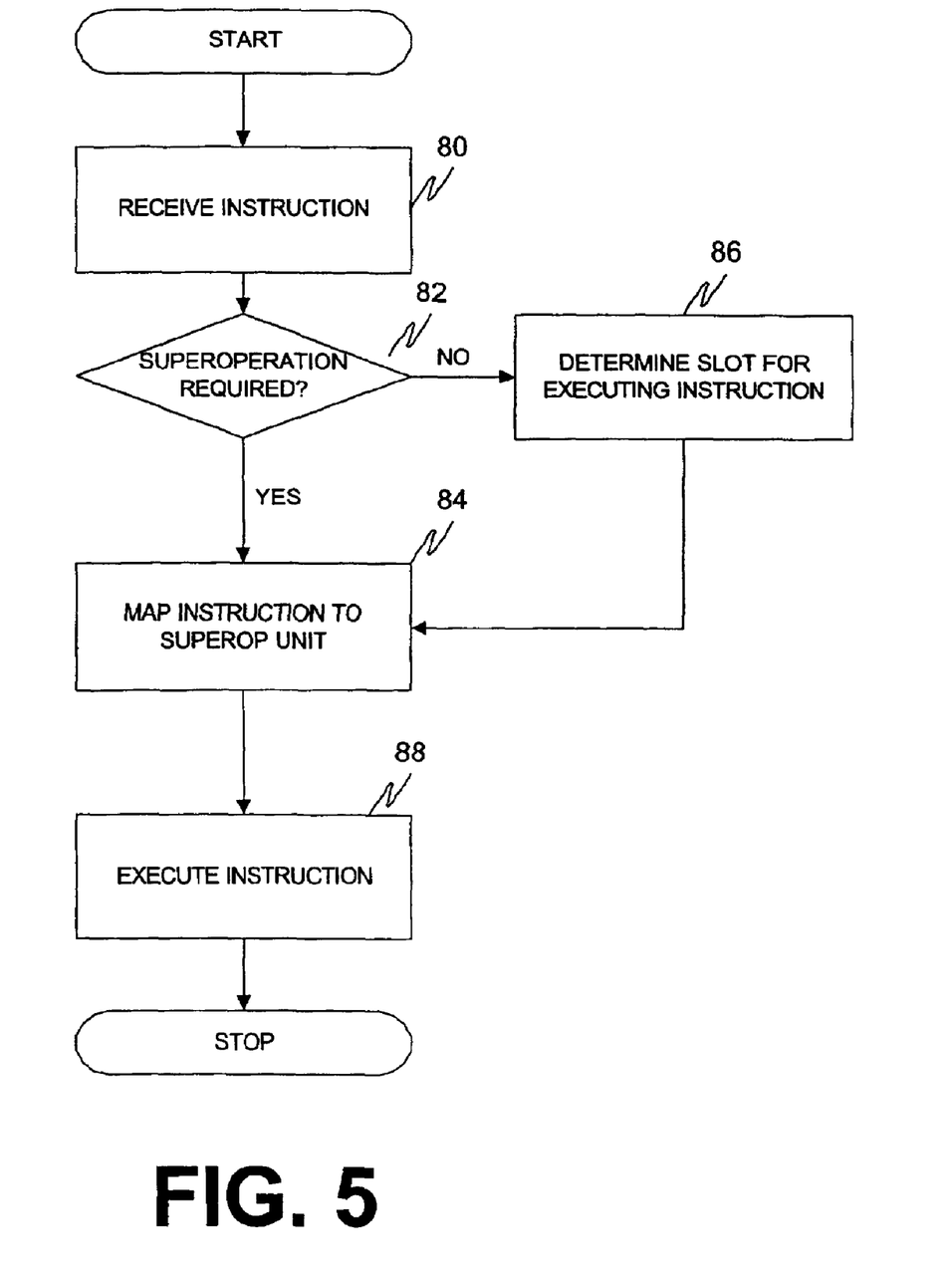
FIG. 5 is a flow chart illustrating a mode of operation for mapping processor instructions to functional units.

In addition, while the above-described examples assume that the compiler reduces superoperations to regular operations or to smaller superoperations, the invention is not so limited. For example, processor 10 of FIG. 1 can map superoperations to a subset of issue slots of superop unit 22 at run time. After processor 10 receives an instruction via fetch unit 16 of FIG. 1 and decodes the instruction using decode unit 18 (80), control unit 12 analyzes the instruction and other data for the superoperation to determine whether processor 10 must necessarily execute the instruction as a superoperation or whether processor 10 can instead map the instruction to a subset of the functional units (82). Fetch unit 16, decode unit 18, or both, possibly in combination with other components, may be involved in this analysis.

If the instruction must be executed as a superoperation, processor 10 maps the instruction to a super functional unit, such as superop unit 22 of FIG. 1 (84). On the other hand, if processor 10 determines that the instruction can be mapped to a single functional unit, processor 10 optionally determines which slot or slots of the super functional unit to use for executing the instruction (86). Processor 10 makes this determination by analyzing the data associated with the instruction and any applicable constraints. For example, if processor 10 determines that a particular superoperation would not use more than two input registers, it would map the instruction to a subset of the issue slots, e.g., a single slot, of the super functional unit, as the additional input registers would not be necessary. Processor 10 determines which slot to use based on, for example, the type of operation and any constraints, such as limitations as to the number of operations of a particular type that can be performed simultaneously. While there may be some architectural or other constraints on the maximum number of single operations that can be mapped onto the super functional unit, the invention offers improved flexibility in assigning instructions to slots.

Processor 10 then executes the instruction using either the entire super functional unit or the selected slot or slots of the super functional unit (88). To execute the instruction, the super functional unit retrieves the operand or operands from register file 20, executes the instruction, and writes the result of the operation into register file 20.

It is to be understood that, even though numerous characteristics and advantages of various embodiments of the invention have been set forth in the foregoing description, together with details of the structure and function of various embodiments of the invention, this disclosure is illustrative only, and changes may be made within the principles of the invention to the full extent indicated by the broad general meaning of the terms in which the appended claims are expressed. For instance, instead of using the compiler to map reducible superoperations to single issue slots, the developer can instead use a predefined function intrinsic to reduce superoperations to single-slot operations under certain circumstances as determined by the developer. This implementation may be advantageous, for example, when the developer has knowledge about the particular application that is not available to the compiler. In addition, the invention is not limited to application to specific types of operations. More particularly, operation types other than shuffle operations can be reduced similarly. Other reducible operations include, but are not limited to, floating point operations.

What is claimed is:

1. A method of compiling a software program for a programmable processor having a functional unit associated with at least two issue slots, the method comprising:

receiving a set of processor-executable operations comprising a first processor-executable operation of a type typically associated with at least two issue slots and a second processor-executable operation; and replacing the first processor-executable operation with a third equivalent processor-executable operation associated with fewer than all of the issue slots, thereby allowing one or more of the rest of the issue slots to be used by the second processor-executable instruction.

2. The method of claim 1, wherein replacing the first processor-executable operation with a third equivalent processor-executable operation further comprises analyzing the first processor-executable operation and external information to determine whether the first processor-executable operation can be replaced by the third equivalent processor-executable operation.

3. The method of claim 1, wherein the third equivalent processor-executable operation is associated with only one issue slot.

4. The method of claim 1, wherein the third equivalent processor-executable operation is associated with a plurality of issue slots.

5. The method of claim 1, wherein replacing the first processor-executable operation with a third equivalent processor-executable operation further comprises:
    determining a number of input registers and a number of output registers that are used by the first processor-executable operation; and
    when the first processor-executable operation uses at most two input registers and one output register, replacing the first processor-executable operation with the third equivalent processor-executable operation associated with only one issue slot.

6. The method of claim 1, wherein the first processor-executable operation is a shuffle operation.

7. The method of claim 1, wherein the first processor-executable operation is a floating point operation.

8. A method of compiling a software program for a programmable processor having a functional unit associated with a plurality of issue slots, the method comprising:
    receiving a processor-executable superoperation of a type typically associated with at least two issue slots;
    determining a number of input registers and a number of output registers that are used by the superoperation; and
    when the superoperation uses at most two input registers and one output register, replacing the superoperation with an equivalent processor-executable operation associated with only one issue slot.

9. The method of claim 8, further comprising:
    identifying any source operations that produce a result affecting a result of the superoperation;
    placing commands for the source operations in instruction words;
    selecting an earliest instruction word from a set of instruction words after the instruction words in which commands for the source operations have already been placed; and
    determining whether an instruction word can be constructed that contains any commands already included in the earliest instruction word in addition to a command for the superoperation.

10. The method of claim 9, further comprising:
    when an instruction word that contains any commands already included in the earliest instruction word in addition to the command for the superoperation cannot be constructed, selecting a subsequent instruction word; and
    determining whether an instruction word that contains any commands already included in the earliest instruction word in addition to the command for the superoperation can be constructed using the subsequent instruction word.

11. The method of claim 8, wherein the superoperation is a shuffle operation.

12. The method of claim 8, wherein the superoperation is a floating point operation.

13. A method of executing a first instruction that is typically associated with at least two issue slot by a processor having a functional unit associated with a plurality of issue slots, the method comprising:
    determining whether the first instruction can be executed using fewer than the at least two issue slots; and
    when the first instruction can be executed using fewer than the at least two issue slots, replacing the first instruction with a second equivalent instruction associated with fewer than the at least two issue slots thereby allowing one or more of the rest of the issue slots to be used by a third instruction.

14. The method of claim 13, wherein determining whether the first instruction can be executed using fewer than the at least two issue slots further comprises:
    determining a number of input registers and a number of output registers that are used by the first instruction; and
    when the first instruction uses at most two input registers and one output register, replacing the first instruction with the second instruction, the second instruction being associated with a single issue slot.

15. The method of claim 13, wherein the second instruction is associated with two or more issue slots.

16. The method of claim 13, wherein the first instruction is a shuffle operation.

17. The method of claim 13, wherein the first instruction is a floating point operation.

18. A processor-readable medium containing processor-executable instructions for:
    receiving a set of operations comprising a first operation of a type typically associated with at least two issue slots of a functional unit of a programmable processor and a second operation; and
    replacing the first operation of the type typically associated with at least two issue slots by a third equivalent operation associated with fewer than all of the issue slots associated with the functional unit, thereby allowing one or more of the rest of the issue slots to be used by the second operation.

19. The processor-readable medium of claim 18, further containing processor-executable instructions for analyzing the first operation and external information to determine whether the first operation can be replaced by the third equivalent operation.

20. The processor-readable medium of claim 18, wherein the third equivalent operation is associated with only one issue slot.

21. The processor-readable medium of claim 18, further containing processor-executable instructions for:
    determining a number of input registers and a number of output registers that are used by the first operation; and
    when the first operation uses at most two input registers and one output register, replacing the first operation with the third equivalent operation associated with only one issue slot.

22. The processor-readable medium of claim 18, wherein the first operation is a shuffle operation.

23. The processor-readable medium of claim 18, wherein the first operation is a floating point operation.

24. A processor-readable medium containing processor-executable instructions for:
    receiving a superoperation of a type typically associated with at least two issue slots of a functional unit of a programmable processor;
    determining a number of input registers and a number of output registers that are used by the superoperation; and
    when the superoperation uses at most two input registers and one output register, replacing the superoperation with an equivalent operation associated with only one issue slot.

25. The processor-readable medium of claim 24, further containing processor-executable instructions for:
- identifying any source operations that produce a result affecting a result of the superoperation;
- placing commands for the source operations in instruction words;
- selecting an earliest instruction word from a set of instruction words after the instruction words in which commands for the source operations have already been placed; and
- determining whether an instruction word can be constructed that contains any commands already included in the earliest instruction word in addition to a command for the superoperation.

26. The processor-readable medium of claim 25, further containing processor-executable instructions for:
- when an instruction word that contains any commands already included in the earliest instruction word in addition to the command for the superoperation cannot be constructed, selecting a subsequent instruction word; and
- determining whether an instruction word that contains any commands already included in the earliest instruction word in addition to the command for the superoperation can be constructed using the subsequent instruction word.

27. The processor-readable medium of claim 24, wherein the superoperation is a shuffle operation.

28. The processor-readable medium of claim 24, wherein the superoperation is a floating point operation.

29. A processor-readable medium containing processor-executable instructions for:
- determining whether a first instruction that is typically associated with at least two issue slots in a functional unit of a processor can be executed using fewer than the at least two issue slots; and
- when the first instruction can be executed using fewer than the at least two issue slots, replacing the first instruction with a second equivalent instruction that is associated with fewer than the at least two issue slots thereby allowing one or more of the rest of the issue slots to be used by a third instruction.

30. The processor-readable medium of claim 29, further containing processor-executable instructions for analyzing the first instruction and external information to determine whether the first instruction can be executed using fewer than the at least two issue slots.

31. The processor-readable medium of claim 29, further containing processor-executable instructions for:
- determining a number of input registers and a number of output registers that are used by the first instruction; and
- when the first instruction uses at most two input registers and one output register, replacing the first instruction with the second instruction, the second instruction being associated with a single issue slot.

32. The processor-readable medium of claim 29, wherein the second instruction is associated with two or more issue slots.

33. The processor-readable medium of claim 29, wherein the first instruction is a shuffle operation.

34. The processor-readable medium of claim 29, wherein the first instruction is a floating point operation.

* * * * *